(12) United States Patent
Ram et al.

(10) Patent No.: US 10,841,372 B1
(45) Date of Patent: Nov. 17, 2020

(54) SYSTEMS AND METHODS FOR PERFORMING USEFUL COMMISSIONED WORK USING DISTRIBUTED NETWORKS

(71) Applicant: Hoot Live, Inc., Menlo Park, CA (US)

(72) Inventors: Arun Ram, Palo Alto, CA (US); Ashok Raj, San Francisco, CA (US)

(73) Assignee: Hoot Live, Inc., Menlo Park, CA (US)

(*) Notice: Subject to any disclaimer, the term of this patent is extended or adjusted under 35 U.S.C. 154(b) by 128 days.

(21) Appl. No.: 16/246,240

(22) Filed: Jan. 11, 2019

Related U.S. Application Data (60) Provisional application No. 62/616,011, filed on Jan. 11, 2018, provisional application No. 62/791,201, filed on Jan. 11, 2019.

(51) Int. Cl.
| | |
|---|---|
| *G06F 15/173* | (2006.01) |
| *H04L 29/08* | (2006.01) |
| *H04L 29/06* | (2006.01) |
| *G06Q 20/36* | (2012.01) |
| *G06F 16/13* | (2019.01) |
| *G06N 20/00* | (2019.01) |
| *H04L 9/32* | (2006.01) |
| *H04L 9/06* | (2006.01) |

(52) U.S. Cl.
CPC ........ *H04L 67/1082* (2013.01); *G06F 16/134* (2019.01); *G06F 16/137* (2019.01); *G06N 20/00* (2019.01); *G06Q 20/367* (2013.01); *H04L 9/0637* (2013.01); *H04L 9/3218* (2013.01); *H04L 65/4076* (2013.01); *H04L 67/1057* (2013.01); *H04L 67/1076* (2013.01); *H04L 2209/38* (2013.01)

(58) Field of Classification Search
CPC ............. H04L 67/1082; H04L 67/1057; H04L 67/1076; G06F 16/137; G06F 16/134
USPC ......................................................... 709/226
See application file for complete search history.

(56) References Cited

U.S. PATENT DOCUMENTS

| | | | | |
|---|---|---|---|---|
| 10,298,395 | B1* | 5/2019 | Schiatti | H04L 9/3239 |
| 10,318,979 | B2* | 6/2019 | Frank | G06Q 30/0217 |
| 10,579,779 | B2* | 3/2020 | Wright | G06F 21/602 |
| 10,616,324 | B1* | 4/2020 | Kaddoura | H04L 67/1076 |
| 2019/0068365 | A1* | 2/2019 | Wright | H04L 9/3213 |
| 2019/0089716 | A1* | 3/2019 | Stocker | H04L 67/1095 |

(Continued)

OTHER PUBLICATIONS

Ball, M. et al., Proofs of Useful Work, Feb. 27, 2017; <https://eprint.iacr.org/2017/203.pdf, 28 pages.

(Continued)

*Primary Examiner* — Hee Soo Kim
(74) *Attorney, Agent, or Firm* — Cooley LLP (57) ABSTRACT

Embodiments described herein generally relate to systems and methods that match the need for processing capability with the supply of computing resources. Similarly stated, embodiments described herein generally relate to systems and methods that allow users with a need for computing resources to have their computational problems serve as a basis for cryptocurrency mining. Embodiments described herein also relate to smart contracts such that users with a need for computing resources can stake a payment token such that miners are incentivized to solve a computational problem and are automatically awarded payment upon completion of the computational problem or a subtask associated with the computational problem.

24 Claims, 5 Drawing Sheets

(56) References Cited

U.S. PATENT DOCUMENTS

| | | | | |
|---|---|---|---|---|
| 2019/0114707 | A1* | 4/2019 | McSheehan | G06Q 20/223 |
| 2019/0320006 | A1* | 10/2019 | Allen | H04L 65/4092 |
| 2020/0034448 | A1* | 1/2020 | Sato | G06F 16/134 |
| 2020/0052903 | A1* | 2/2020 | Lam | H04L 9/3239 |
| 2020/0112446 | A1* | 4/2020 | Yoshihama | G06F 16/1805 |

OTHER PUBLICATIONS http://fortune.com/2017/10/01/blockchain-equifax/, Blockchain: Can It Stop the Next Equifax Breach?; Oct. 2, 2017, 2 pages.
https://github.com/decentralized-identity/identity-hub/blob/master/explainer.md; Identity-hub explainer, 10 pages, Sep. 6, 2018.
https://itunes.apple.com/us/app/hoot-live-stream-decentralized/id1051901240, Hoot Live Stream Decentralized on the App Store version 3.3, Jan. 8, 2019, 3 pages.
https://aws.amazon.com/cloudfront/, Amazon CloudFront, last accessed Jan. 24, 2019, 22 pages.
https://azure.microsoft.com/en-us/services/media-services/, Media Services—Video Streaming Services, Microsoft Azure, last accessed Jan. 24, 2019, 16 pages.
https://digiconomist.net/bitcoin-energy-consumption, Bitcoin Energy Consumption Index, last accessed Jan. 24, 2019, 11 pages.
https://github.com/ethereum/EIPs/issues/223, ERC223 token standard #223, Mar. 5, 2017, 3 pages.
Benet, J., IPFS—Content Addressed, Versioned, P2P File System (Draft 3), Jul. 14, https://arxiv.org/abs/1407.3561, 11 pages.
https://pando.com/2013/12/16/bitcoin-has-a-dark-side-its-carbon-footprint/, Bitcoin has a dark side: its carbon footprint, Dec. 16, 2013, 5 pages.
https://play.google.com/store/apps/details?id=com.onhoot.android, Hoot-Apps on Google Play version 1.1.3, Oct. 9, 2015, 2 pages.
Acmqueue vol. 15, issue 4, Bitcoin's Academic Pedigrees, Aug. 29, 2017, https://queue.acm.org/detail.cfm?id=3136559, 30 pages.
https://www.wowza.com/products, Video Streaming Products, Wowza Media Systems, last accessed Jan. 24, 2019.
McMillan, R. et al. Equifax CEO to Congress: Not Sure We are Encrypting Data, 2017, Wall Street Journal, Nov. 8, 2017, available at https://www.wsj.com/articles/equifax-ceo-to-congress-not-sure-we-are-encrypting-data-1510180486, 2 pages.
Wahab, A. & Memood, W., Survey of Consensus Protocols, Oct. 8, 2018; <https://arxiv.org/ftp/arxiv/papers/1810/1810.03357.pdf, 12 pages.

* cited by examiner

SYSTEMS AND METHODS FOR PERFORMING USEFUL COMMISSIONED WORK USING DISTRIBUTED NETWORKS

CROSS REFERENCE TO RELATED APPLICATIONS

This application claims the benefit of provisional U.S. Patent Application No. 62/616,011, filed Jan. 11, 2018 and U.S. Patent Application No. 62/791,201 filed Jan. 11, 2019, the disclosure of each of which is hereby incorporated by reference in its entirety.

FIELD

Embodiments described herein generally relate to a distributed network of miner nodes available to perform computing tasks. A smart contract stored in a distributed ledger can identify a computing task and automatically cause miner nodes to be compensated for participating in the performance of the computing task.

BACKGROUND

As of January 2019, it is estimated that approximately 47 TWh of electricity are consumed performing unproductive computational work to mine bitcoins, and approximately 10 TWh of electricity are consumed performing unproductive computational work to mine Ether. In the run up to the January 2018 peak of the cryptocurrency market, miners acquired a large amount of specialized computer hardware, including high-powered graphics cards, in an attempt to profit by mining cryptocurrency.

At the same time, demands for computational power have grown resulting from advances in streaming video, artificial intelligence research, machine learning, consumer voice recognition applications, autonomous vehicles, genome sequencing, 3D and virtual/augmented reality rendering and many other technologies. For-profit companies have turned to large cloud services and content delivery networks, such as Amazon Web Services®, Microsoft Azure®, and Akamai® to satisfy their processing and bandwidth needs at significant expense. Academics and not-for-profit entities may have difficulty affording the processing capability they seek.

The glut of graphics processing cards and other mining hardware theoretically could be retasked to meet the demands for additional computational power, but existing frameworks for distributed computing, such as SETI@home and Folding@home do not provide monetary incentives and are therefore not attractive to profit-motivated cryptocurrency miners. A need therefore exists for an incentivized distributed computing system capable of performing useful work.

DETAILED DESCRIPTION

Embodiments described herein generally relate to distributed ledger or blockchain technology. In known distributed ledger implementations, miner nodes receive a reward for solving a cryptographic puzzle. Cryptographic puzzles used in distributed ledger implementations typically do not produce any useful computational output, resulting in wasteful consumption of energy. A few researchers have explored "proof of useful work," but these proposals generally involve substituting the useless cryptographic puzzle used by protocols like bitcoin for one fixed hard computational problem, such as protein folding or matrix manipulation. Unlike such known proposals, embodiments described herein generally relate to systems and methods that match the need for customized and on-demand processing capability with the supply of computing resources. Similarly stated, embodiments described herein generally relate distributed networks operable to perform arbitrary computational tasks and/or multiple computational tasks. Embodiments described herein generally allow users with a need for computing resources to have their computational problems serve as a basis for cryptocurrency mining on an existing distributed network. Embodiments described herein also relate to smart contracts such that users with a need for computing resources can stake a payment token such that miners are incentivized to solve a computational problem and are automatically awarded payment upon completion of the computational problem or a subtask associated with the computational problem.

Some embodiments described herein relate to a computer-implemented method of operating a miner node operating within a distributed network. The miner node can send an indication of an available processing capability to a master node or other node storing an instance of a distributed ledger. The miner can receive an indication of a processing task that is associated with a smart contract recorded in the distributed ledger. The miner can execute the processing task to completion and define a cryptographic proof that the processing task was completed. An output of the processing task can be sent to a recipient. A wallet associated with the miner node can receive a payment token in response to the cryptographic proof satisfying a condition of the smart contract.

Some embodiments described herein relate to a computer-implemented method of operating a master node operating within a distributed network. The master node can be operable to access a smart contract containing a processing request. The master node can access a distributed hash table stored on a distributed ledger that identifies miner nodes that are offering processing capability. The master node can further identify a recipient node to which an output of the processing request is to be sent. One or more miner nodes can be selected to perform the processing task based on at least one of processing capability offered by the miner node(s), geographic proximity between the processing node (s) and the recipient node, reputation of the miner node, and/or value of a payment token staked by the miner node(s).

Some embodiments described herein relate to a computer-implemented method of operating a customer node. The customer node can define a processing task for completion by a distributed network. In some instances, the customer node can shard or divide the processing task into subtasks suitable for completion by individual miner nodes. The customer node can define a smart contract that identifies the processing task (or subtasks) and includes a staked payment token for release upon successful completion of the processing task. The smart contract can be submitted to a distributed ledger. Miner nodes participating in the distributed network can each complete one or more subtasks associated with the processing task. When the processing task (or subtasks) are complete, the smart contract can automatically award a portion of the staked payment token to wallets associated with miners who participated in completing the processing task.

Figure 1:
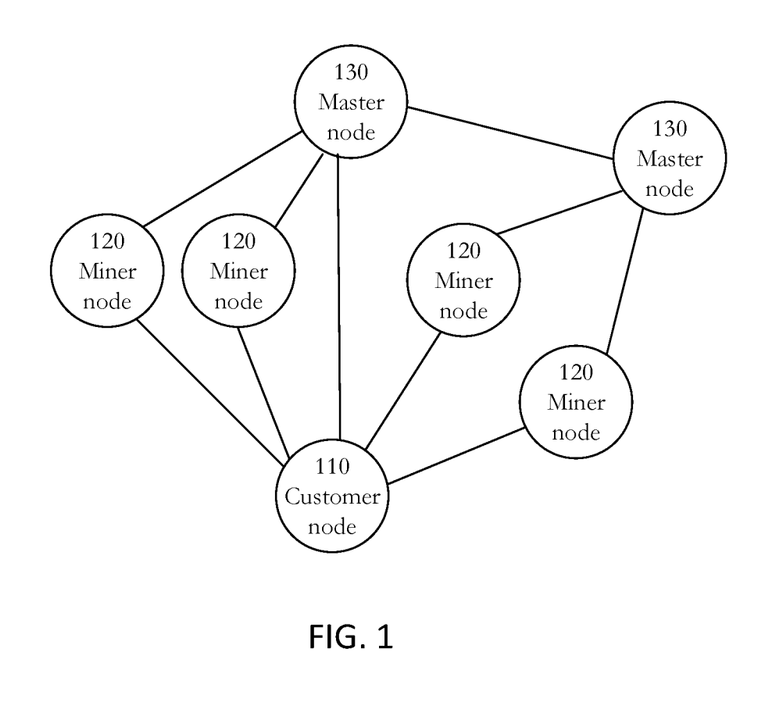
FIGS. 1 and 2 are schematic illustrations of distributed networks, according to two embodiments.

FIG. 1 is a schematic illustration of a distributed network, according to an embodiment. The distributed network includes a customer node 110, multiple miner nodes 120, and one or more master nodes 130. Each of the customer node 110, miner nodes 120, and master nodes 130 is a compute device having a processor and a memory. Each of the customer node 110, miner nodes 120, and master nodes 130 can store an instance of a distributed ledger or blockchain. The distributed ledger can provide a decentralized virtual machine operable to execute scripts or smart contracts. For example, the distributed ledger can include some or all of the features of the Ethereum protocol.

The customer node 110 can be associated with a user that wishes to have a processing task completed. The customer node 110 can be operable to define or queue a processing task for completion by the distributed network and define a smart contract that identifies the processing task. The smart contract can include a staked payment token. Similarly stated, the smart contract can identify a quantity of cryptocurrency that is placed into escrow pending completion of the processing task. The customer node 110 can be operable to deploy the smart contract to the distributed ledger.

The miner nodes 120 may be optimized for highly parallelized computational processes. For example, the miner nodes 120 can include one or more graphical processing units and a high speed memory. Generally, miner nodes 120 will include at least one OpenCL compatible chipset.

Miner nodes 120 can be operable to request work from the distributed network, for example, by staking a payment token and/or interacting with a smart contract stored in the distributed ledger (e.g., the a smart contract defined by a customer node 110 and/or a smart contract defined by a master node 130 associated with managing miner nodes 120). Miner nodes 120 who have requested work can be identified via a distributed hash table stored on the distributed ledger in response to miner nodes requesting work. Alternatively, a table identifying miner nodes 120 can be maintained off of the distributed ledger, for example, on a master node 130. Once assigned work by a master node 130 (discussed in further detail below) a miner node 120 can perform a processing task and report an output of the processing task to the customer node 110, either directly or through an intermediary such as a master node 130 or another miner node 120.

After performing a processing task assigned to it, a miner node 120 can calculate a cryptographic proof of work, such as a zero knowledge proof of compute (e.g., a zk-POC and/or zero-knowledge succinct non-interactive argument of knowledge (zk-SNARK)). The cryptographic proof of work can be used to demonstrate that the miner node 120 faithfully executed the processing task and did not cheat by, for example, returning junk data in response to receiving a processing task. In the event that the zk-POC indicates that a miner node is not faithfully performing an assigned processing task, or in the event that a miner node 120 leaves the distributed network before completing the assigned processing task, the smart contract associated with the processing task can cause some or all of a payment token staked by that miner node 120 to be slashed or transferred to a wallet associated with the smart contract associated with the processing task and/or the customer node 120.

The master nodes 130 can store an instance of the distributed ledger, including the smart contract deployed by the customer node 110. The master nodes 130 can be operable to access a distributed hash table or other data source identifying available miner nodes 120. The master node 130 can be operable to divide the processing task into subtasks and assign substasks to available miner nodes 120. Miner nodes 120 can be selected based on available processing capability, size of stake, reputation (e.g., history of successfully completing processing tasks), and/or geographical proximity to the customer node 130. In general, a master node 130 can, for example, preferentially assign subtasks to miner nodes 120 with greater available processing capability, that have staked relatively larger payment tokens, with relatively good reputations, and/or that are geographically proximate to the customer node 110. Master nodes 130 can assign subtasks based on a delegated proof of stake (DPoS) model, which can cause more subtasks to be assigned to larger miners, which can improve network scalability. Master nodes 130 can also assign subtasks based on miner node reputation, which can be determined based on a history of successfully completed subtasks and/or Merkle tree-based reputation, as described in further detail in provisional U.S. Patent Application No. 62/791,201, under the heading "11.1 Merkle DB: GPUCoin's censorship resistant peer-to-peer identity, trust, & reputation block-chain." For example, reputation information of various miner nodes can be encoded into the distributed ledger using a Merkle tree structure, in which each miner node 120 is identified by a public key, username, and/or decentralized identify hashed into distributed ledger. Master nodes 130 can automatically receive a payment token (e.g., a portion of the payment token staked by the customer node 110) in response to assigning subtasks to available miner nodes 120.

The master nodes 130 can also be operable to verify that miner nodes 120 faithfully performed their assigned computational tasks. For example, master nodes 130 can assign the same subtask to multiple miner nodes 120 and compare the output and/or cryptographic proof-of-work. As another example, the master node 130 can randomly assign processing tasks with a known output or cryptographic proof-of-work to verify that miner nodes 120 are not cheating. In some instances, all subtasks may be assigned to multiple miner nodes 120 and consistency of output or cryptographic proof-of-work for each subtask verified. In other instances, miner nodes 120 may be randomly and/or occasionally verified. In some instances, the master nodes 130 can compile the results of the various subtasks and report an overall output of the processing task to the customer node 110. In other instances, each miner node 120 can be operable to report an output of a subtask to the customer node 110 as each subtask is completed.

Although master nodes 130 are described as performing both scheduling (e.g., defining and/or assigning subtasks) and verification functions, in other embodiments different nodes (e.g., a scheduler node and a verifier node) can perform these different functions.

The distributed network shown in FIG. 1 is shown and described such that the customer node 110 both defines a processing task and receives an output of the completed processing task. Such a scenario is common, for example, when training a machine learning algorithm, analyzing a large data set, rendering computer graphics, and the like. It should be understood, however, that the customer node 110 can specify that the output of the processing task be delivered to a different compute device.

Figure 2:
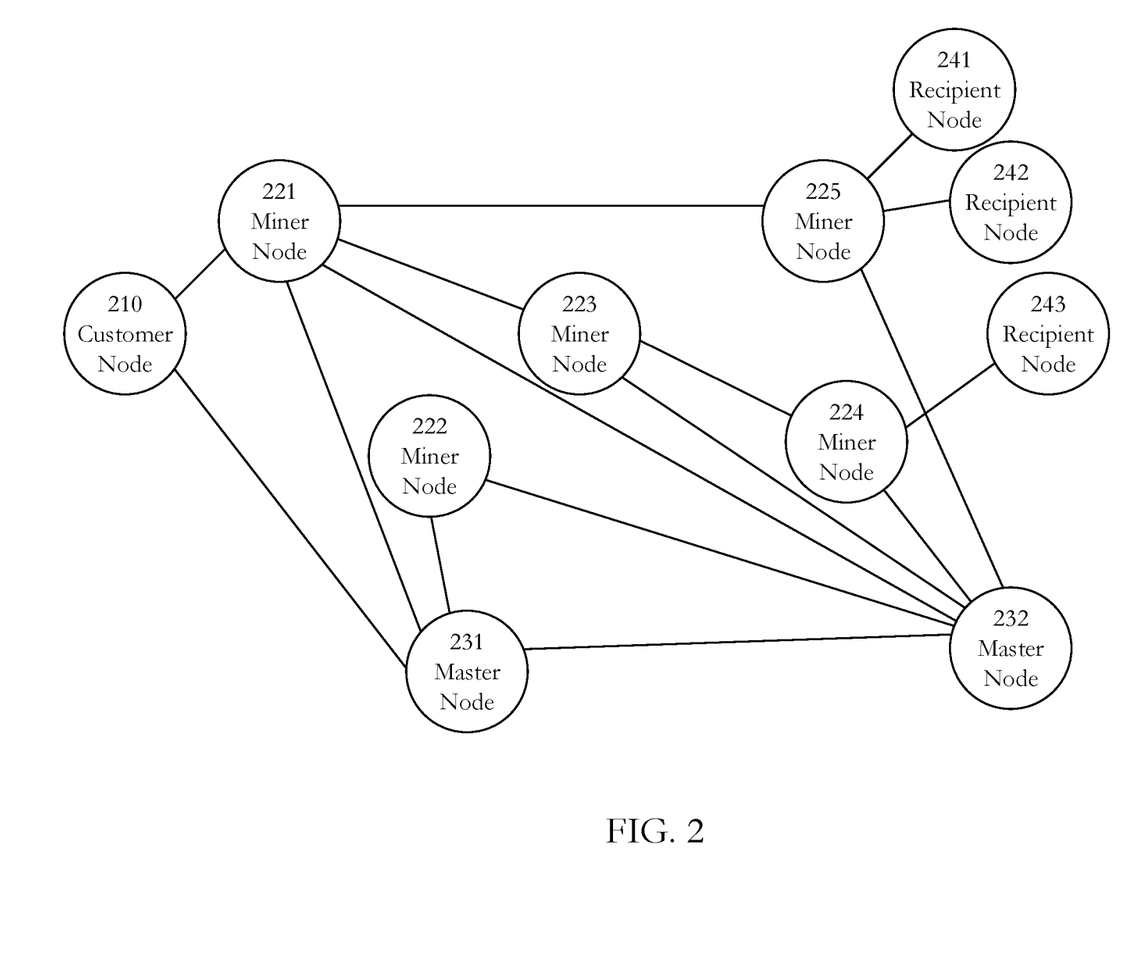

FIG. 2 is a schematic illustration of a distributed network, according to an embodiment. The distributed network of FIG. 2 is similar to the distributed network of FIG. 1, and includes a customer node 210, which can be structurally and/or functionally similar to the customer node 110. The distributed network of FIG. 2 also includes miner nodes 221-225, which can be structurally and/or functionally similar to the miner nodes 120 of FIG. 1. The distributed network of FIG. 2 includes master nodes 231, 232, which can be structurally and/or functionally similar to the master nodes 130 of FIG. 1. The distributed network of FIG. 2 further includes multiple recipient nodes 241-243. Recipient nodes 241-243 are compute devices having a processor and a memory that are configured to receive an output of a processing task. As one example, the distributed network of FIG. 2 can be used to deliver streaming and/or live video from the customer node 210 to the recipient nodes 241-243.

Existing techniques for delivering live and/or streaming video rely on managed content delivery networks (CDNs) or peer-to-peer protocols, such as bit torrent. Known CDNs are centrally managed, expensive to access, and subject to private or governmental censorship. Known CDNs further generally operate by storing uploaded video in relatively large chunks (e.g., 30 s-1 min) and then providing access to those chunks as they are completed. As a result, the use of a CDN to stream "live" video results in a significant latencies of tens of seconds to minutes. Known peer-to-peer protocols are only capable of distributing video after a complete copy has been uploaded and are therefore unsuitable for streaming live video as it is created. Similarly stated, known systems for distributing video are generally unsuitable for distributing live video in near real-time as it is recorded. The distributed network of FIG. 2 is operable to stream video from the customer node 210 to the recipient nodes 241-243 with extremely low (e.g., sub second) latency.

As discussed above with reference to FIG. 1, the customer node 210 can be operable to define or queue a processing task for completion by a distributed network and define a smart contract that identifies the processing task. The smart contract can include a staked payment token. Similarly stated, the smart contract can identify a quantity of cryptocurrency that is placed into escrow pending completion of the processing task. In some instances the processing task can include streaming media, such as video and particularly live video, that originates at the customer node 210. Typically in a video streaming instance, the processing task will be to provide the video to any recipient nodes who request the video, but it is also possible that the processing task could be to stream the video to predefined recipient nodes. The customer node 210 can connect to miner node 221 and transmit video encoded in short chunks (e.g., 100, 200, 300 milliseconds long) to the miner node 221. Similarly stated, the miner node 221 can act as a seeder node 221, operable to cache the video as it is received and act as a distribution point for the video. It should be understood, however, that the processing task include streaming media from any source (e.g., other than the customer node 210) to recipient nodes 241-243.

In some embodiments, the customer node 210 can test the available upstream bandwidth and determine the encoding, etc., to optimize use of available upstream bandwidth. The customer node 210 can evaluate upstream bandwidth dynamically, on a periodic basis, and/or in response to changing network conditions (e.g., increasing or decreasing received signal strength indication). If the available upstream bandwidth changes, the customer node 210 may change the video resolution, video encoding traits (e.g., bit rate), audio encoding traits, etc. based on the available upstream bandwidth.

The customer node 210 may also switch seeder nodes depending on signal strength, node status, etc. For example, if the customer node 210 is using a smartphone to broadcast video via a cellular network while moving, the smartphone may switch seeder nodes (e.g., the miner node to which the customer node 210 is directly connected) automatically as the broadcaster moves.

Recipient nodes 241-243 can request the streaming video from the distributed network by connecting to a miner node 221-225 and identifying the streaming video by a unique identifier (which may be specified in the smart contract associated with distributing the streaming video). The recipient nodes 241-243 can discover the unique identifier by any suitable manner. For example, the source device 210 may broadcast the unique identifier via a side channel (e.g., hoot.com, Twitter, etc.). Alternatively, the recipient nodes 241-243 can store an instance of the distributed ledger and discover the unique identifier from the smart contract. Any other suitable pull or push notification process to alert the recipient nodes 241-243 may also be used.

If a recipient node 241-243 and the customer node 210 are connected to the same miner node 221-225 in the distributed network, that miner node can provide the streamed video directly to the recipient node. If the customer node 210 and a recipient node 241-243 are connected to different nodes in the distributed network, in some instances, the master nodes 231, 232 can instruct the seeder node 221 to connect directly to a miner node 225 connected to one or more recipient nodes 241, 242, such that the video and data fragments that make up the streaming video are transferred from seeder node 221 to miner node 225 and then directly to recipient nodes 241, 242. In other instances, the miner node 224 connected to a recipient node 243 can broadcast a request for the customer node's 210 video stream to other miner nodes 223 in the distributed network. The other miner nodes 223 can pass this request on until it reaches the seeder node 221 or another miner node that has the requested live stream, at which point the seeder node 221 or the other miner node can provide the requested video stream to the miner node 224 connected to the recipient node 243, possibly via one or more other miner nodes 223 in the distributed network. In yet other instances, the master nodes 231, 232 can define a route that includes one or more miner nodes 221-225 connecting the customer node 210 to the recipient devices 221-243.

In some instances, miner nodes 221-225 can perform processing tasks requested by the customer node 210 without being on a path between the customer node 210 and a recipient node 241. For example, miner node 222 can be assigned a processing task by a master node 231, 232, complete the processing task, send an output of the processing task to a master node 231, 232, which then reports the output of the processing task (optionally integrated with outputs of other processing tasks completed by other miner nodes) to a recipient node 241-243 (optionally via one or more other miner nodes).

The master nodes 231, 232 can be operable to monitor available miner nodes 221-225 and identify recipient nodes 241-243 that have requested the streaming video. The master nodes 231, 232 can dynamically assign tasks to miner nodes 221-225 to build out and balance a distribution channel based on demand. For example, the master nodes 231, 232 can be operable to identify that recipient nodes 241 and 242 are in a similar geographic region and task miner node 225 to deliver the streaming video to recipient nodes 241 and 242. The master nodes 231, 232 can further be operable to task miner node 224 to deliver the streaming video to recipient node 243. For example, miner node 224 may be closer to recipient node 243 than miner node 225 (e.g., have a lower latency). Additionally, the master nodes 231, 232 can be operable to monitor the workload of miner nodes 221-225 and assign new miner nodes to distribute the video as workload at the miner nodes 221-225 increases. Thus, as demand for a streaming video grows, new miner nodes can be tasked with providing the streaming video. For example, the master nodes 231, 232 can be operable to activate new miner nodes when one miner node reaches a predetermined percentage (e.g., 70%) of its available bandwidth, such that that miner node stops accepting new connections with recipient devices 241-243 and instead starts storing the video in a local buffer for distribution to other miner nodes 221-225 nodes in the distributed network. For instance, if a miner node in the distributed network has 1 Gbit bandwidth/ ethernet capacity and the data rate for each connection is 1 Mbit/s, then that miner node can support 1000 inputs and outputs. In this example, 700 Mbit/s of that miner node's available bandwidth is reserved for connections to customer nodes and recipient nodes and 300 Mbit/s is reserved for connections to other miner nodes. Thus, adding miner nodes to the distributed network scales the number of connections available for customer nodes and recipient nodes.

As discussed above with reference to FIG. 1, master nodes 231, 232 can also be operable to verify the faithful completion of computational tasks (e.g., successful delivery of streaming video) by auditing a cryptographic proof-of-work associated with the encoding and/or delivery of the streaming video. The miner nodes' 221-225 cryptographic proof of work can be compared to a similarly computed cryptographic hash generated by the customer node 210. If the cryptographic hash generated by the customer node 210 matches a cryptographic proof-of-work generated by a miner node 221-225, the customer node 210 can send a signal to a node containing an instance of the smart contract to cause a portion of the payment token staked by the customer node 210 to be released to a wallet associated with the miner node that generated the valid proof-of-work.

If a miner node 221-225 wants to join or leave the distributed network, the miner node should ensure that connected customer nodes 210, recipient nodes 241-243, and other miner nodes transition to other still-available miner nodes in the distributed network to avoid interruptions in the processing task. A miner node 241-243 may incur a penalty (e.g., loss of reputation, staked payment token, recently earned payment token) if it drops out of the distributed network without notification.

Figure 3:
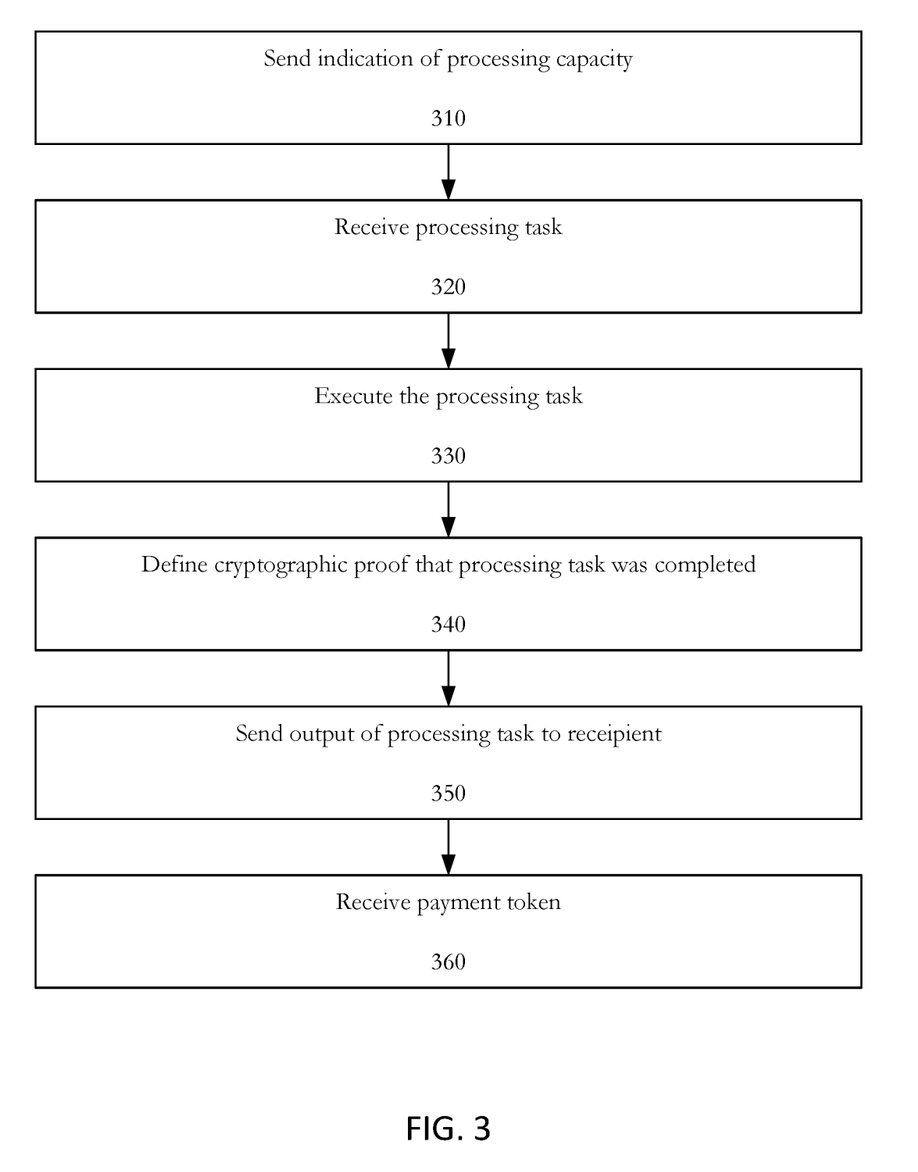
FIG. 3 is a flow chart of a method of operating a miner node, according to an embodiment.

FIG. 3 is a flow chart of a method of operating a miner node, according to an embodiment. As discussed above, a miner node is a compute device that is participating in a distributed network associated with a distributed ledger. Typically, the miner node will have one or more GPUs or other highly parallel processing pipelines. Embodiments described herein generally seek to match compute devices with excess processing capability (e.g., gamers, cryptocurrency miners) with individuals and entities who would typically rely on cloud computing providers or CDNs. By incentivizing mining nodes to perform useful work, this excess processing capability can be devoted to paying, productive work, rather than being wasted as is typical for cryptocurrency mining. Furthermore, a distributed network of mining nodes may offer lower cost processing capability than existing cloud providers or CDNs. The method described with reference to FIG. 3 is a computer-implemented method.

At 310, an indication of processing capacity can be sent to a node of a distributed network. The indication of the processing capacity can be sent, for example, to a master node as discussed above and/or recorded on the distributed leger, for example in a smart contract. The indication of processing capacity can include, for example, an indication of available GPU processing capability and/or available GPU cycles. In some instances, the indication of processing capacity can include and/or be accompanied by a staked payment token. Similarly stated, the miner node can commit a value of cryptocurrency to escrow as security against malfeasance. In some instances the smart contract requesting the processing task can make it a precondition for miner nodes to stake a payment token before they can be selected for completing the processing task and/or subtasks associated with the processing task. As discussed in further detail herein, miner nodes with large staked values can be preferentially selected for processing tasks. Furthermore a miner nodes stake can be slashed (e.g., transferred to a wallet associated with a customer node or wallet associated with a processing task) in the event that the miner node does not faithfully complete the processing task and/or exits the distributed network without completing and/or gracefully handing off connections.

At 320, the mining node can receive an indication of a processing task. For example, a master node can select the miner node and assign a task to the mining node. The task assigned to the miner node can be, for example, a subtask associated with training a machine learning model, processing a data set, streaming video, or any other suitable computing task. Similarly stated, the task assigned to the miner node can be a portion of a larger distributed task, and multiple miner nodes can operate cooperatively and/or in parallel to complete the task requested by a customer node.

At 330, the miner node can be operable to execute the processing task to completion. A cryptographic proof that the processing task was completed can be defined at 340. For example, the miner node can compute a cryptographic hash, such as a zk-POW, zero-knowledge, non-interactive POW, and/or zk-SNARKs value. The output of the cryptographic processing task can be sent to a recipient node, at 350. In some instances, the recipient node can be the customer node (e.g., when the computing task is training a machine learning model). In other instances, the recipient node can be a node other than customer node (e.g., when the computing task is streaming video). In some instances, the immediate recipient can be another node of the distributed network that within a route to the recipient node. Similarly stated, the miner node may not be directly coupled to the recipient node, but may pass the result of the computing task to the recipient node via one or more intermediate nodes of the distributed network. In some instances, the recipient node can be a master node, such that the master node can combine or coordinate outputs of multiple subtasks completed by multiple miner nodes before passing an output of the overall processing task to the ultimate recipient node.

In instances in which the processing task is streaming a live video, the processing task can include transferring the live video from the customer node to the recipient node with a latency of less than one second. Thus, the miner node may be tasked with receiving and forwarding the live video while introducing no more than a predefined latency (e.g., 100, 200, 300 ms). In some such instances, the miner node can also be tasked with storing an archive or permanent copy of the live video, for example, in parallel with streaming the live video. For example, a copy of the live video can be stored in a descentralized file system, such as the Inter Planetary File System (IPFS), or in any other suitable data repository (e.g., YouTube).

At 360, a wallet associated with the miner node can be awarded a payment token. The payment token can be automatically awarded by a smart contract (e.g., defined by a customer node) upon completion of the assigned processing task and/or production of a proof of work demonstrating the faithful (accurate) completion of the processing task. In some instances, a master node, a customer node, and/or a recipient node can send a signal to a node storing an instance of a smart contract to cause the smart contract to perform an action, such as releasing payment to the miner node, that was contingent upon receiving the output of the processing task and/or verifying the proof of work generated by the miner node. In addition or alternatively, the payment token staked by the customer node can be divided amongst all miner nodes that performed subtasks associated with the processing task commissioned by the customer node (e.g., in proportion to their contribution to the processing task, in proportion to their stake, in proportion to their reputation, etc.).

In addition to being awarded a portion of the payment token staked by the customer node, the miner node can compete with other miner nodes to mine additional payment tokens in a manner similar to those of known distributed ledger protocols. Similarly stated, in addition to being awarded a portion of the transaction fees associated with completing the processing task, the miner has an opportunity to mine new cryptocurrency payment tokens.

Figure 4:
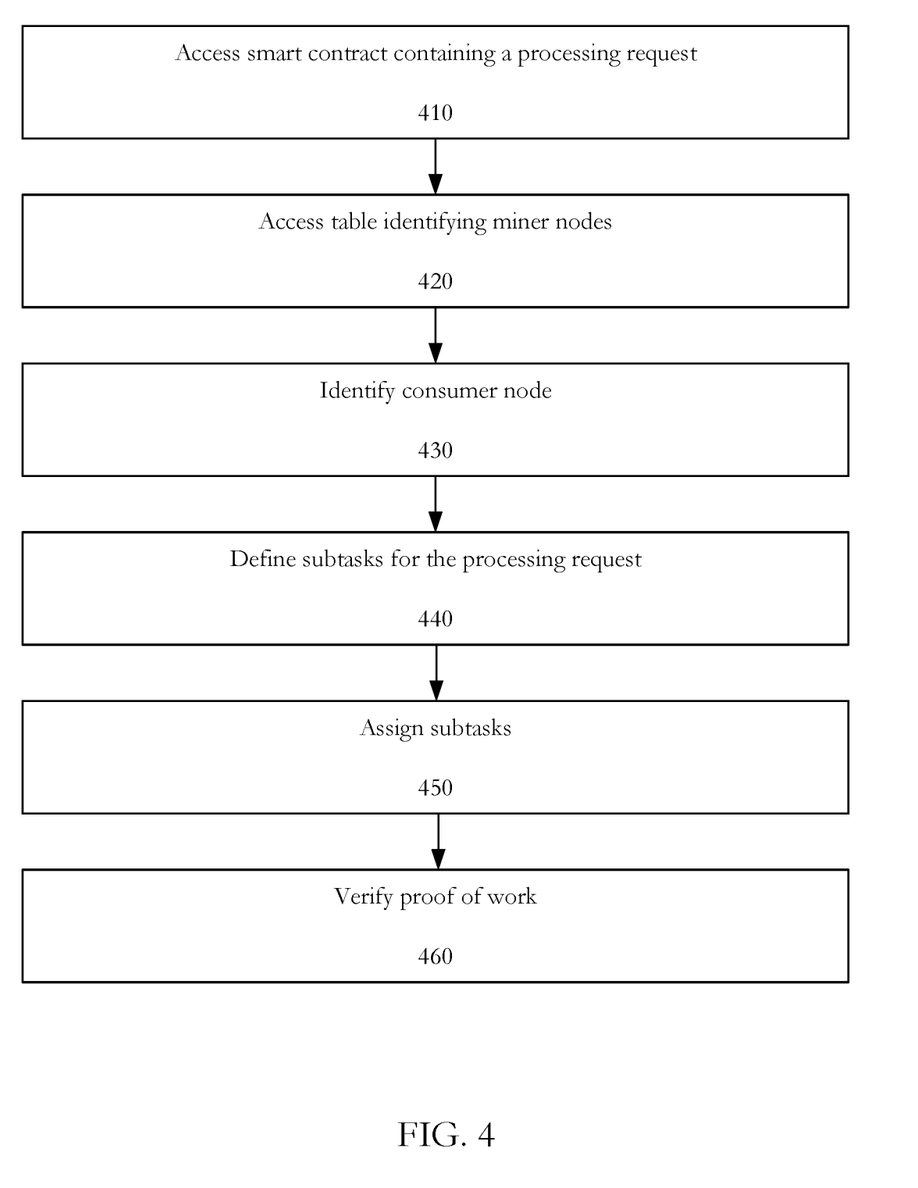
FIG. 4 is a flow chart of a method of operating a master node, according to an embodiment.

FIG. 4 is a flow chart of a method of operating a master node, according to an embodiment. As discussed above, a master node can be operable to coordinate miner nodes and/or verify that miner nodes are faithfully (accurately) executing processing (sub)tasks assigned to them. The method described with reference to FIG. 4 is a computer-implemented method.

At 410, the master node can access a smart contract containing a processing request. The smart contract can be contained within a block of a distributed ledger. The smart contract may further identify a staked payment token placed in escrow that can be automatically released to miner nodes who participate in the completion of the processing request.

At 420, the miner node can access a table (e.g., a distributed hash table) that identifies available miner nodes. The master node can further identify the customer node (e.g., the node that requested the processing task be completed), at 430. In instances in which the customer node is not the recipient of the output of the processing task (e.g., when the processing task involves streaming video), the master node can further identify recipient node(s).

At 440, the master node can divide the processing task into subtasks and, at 450 the master node can assign subtasks to miner nodes. Miner nodes can be selected to perform subtasks based on, for example, available processing capacity, geographic location relative to recipient node and/or customer node, value of staked deposit, and/or reputation.

At 460, the master node can audit miner nodes to verify that they faithfully (accurately) performed the assigned subtask. In some instances miner nodes can be selectively audited (e.g., randomly, based on reputation, based on staked value, etc.). In other instances, all miner nodes can be audited. Auditing a miner node can include assigning the same subtask to multiple miner nodes and verifying that returned cryptographic proofs of work (e.g., a zk-POW or zk-SNARK) computed by the miner nodes after the subtasks are completed match, verifying a proof of work returned by a miner node with a proof of work calculated by the customer node, or any other suitable technique. The cryptographic proofs of work can validate that the output of the processing task was sent to a recipient node (e.g., in the case of streaming video) and/or that the processing task was faithfully (accurately) calculated and returned to the customer node (e.g., in the case of training a machine learning model). In the case of streaming video, the master node can be further operable to dynamically activate (select miner nodes that indicated processing capacity) nodes based on demand for the video and/or geographic proximity between recipient nodes and miner nodes. In such an instance, the master node can be operable to define a route such that latency between the customer node and recipient node(s) is kept below a predefined threshold (e.g., one second). In this way, video can be live streamed between the customer node and recipient node(s) without the need to cache large (e.g., longer than 5 second) chunks of video at a seeder node prior to distributing the video.

In some instances, after verifying that a processing subtask was completed and/or auditing a proof of work, the master node can send a signal to a node storing an instance of the smart contract to cause the smart contract to release transaction fees (payment tokens staked by the customer node) to the miner node(s). In this way, a wallet(s) associated with the miner node(s) can automatically receive transaction fees associated with performing the processing task requested by the customer node.

Figure 5:
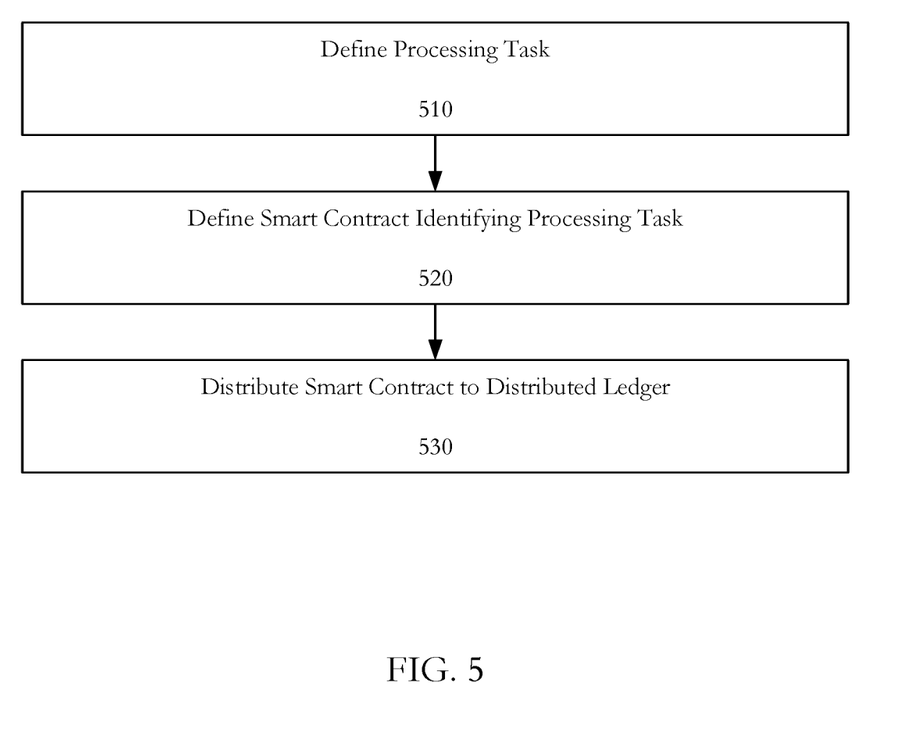
FIG. 5 is a flow chart of a method of operating a customer node, according to an embodiment.

FIG. 5 is a flow chart of a method of operating a customer node, according to an embodiment. The method of FIG. 5 is a computer-implemented method.

At 510, the customer node can define a processing task for completion by a distributed network. The processing task can be any suitable processing task, and can, for example, be one that has historically been performed by cloud computing services and/or CDNs. Highly parallelizable processing tasks, such as training machine learning algorithms and streaming video are particularly well suited for computation by the distributed networks described herein, but other processing tasks are possible. At 520, the customer node can define a smart contract that identifies the processing task and includes a staked payment token for release upon successful completion of the processing task. The size of the staked payment can influence a priority that the processing task receives form the distributed network. Similarly stated, if the customer node stakes a large payment token, miner nodes may preferentially perform subtasks associated with the customer node's processing task over (or before) performing subtasks of other customer nodes.

The smart contract can be distributed to a distributed ledger, at 530, such that the processing task can be completed by a distributed network. The distributed network (e.g., through coordination of master nodes) can divide the processing task into subtasks, each of which can be executed by a miner node. In other instances, defining the smart contract, at 520 can include dividing the processing task into discreet subtasks for execution by various miner nodes. Miner nodes, upon completion of subtasks, can additionally generate cryptographic proofs-of-work to ensure that the subtasks were completed faithfully (accurately). The smart contract can be defined such that the payment token staked by the customer node is automatically awarded upon completion of the processing task, completion of processing subtasks, and/or verification of a miner node's cryptographic proof-of-work.

In some instances, the customer node can further be operable to receive an output of the processing task. For example, in an instance where the processing task involves training a machine learning model, the customer node can receive, from the distributed network, weights or other parameters for a trained machine learning model.

In instances in which miner nodes fail to complete assigned subtasks, leave the distributed network without notice (e.g., disconnect and/or cease performing assigned subtasks), and/or or do not faithfully (accurately) execute assigned subtasks (e.g., attempt to cheat), a wallet associated with the customer node and/or a wallet associated with the smart contract identifying the processing task can be automatically awarded payment tokens staked by those miner nodes who failed to fulfil their obligations.

While various embodiments have been described above, it should be understood that they have been presented by way of example only, and not limitation. Furthermore, although various embodiments have been described as having particular features and/or combinations of components, other embodiments are possible having a combination of any features and/or components from any of embodiments where appropriate as well as additional features and/or components. U.S. Patent Application No. 62/616,011, filed Jan. 11, 2019 and U.S. Patent Application No. 62/791,201 filed Jan. 11, 2019 are each incorporated by reference in its entirety and describe additional aspects of the various distributed networks, smart contracts, distributed ledgers, nodes, and other features described herein. It should be understood that additional disclosure related to any features described in the above-identified provisional applications apply equally to similar features described in the present application.

In some embodiments, the nodes of distributed networks described herein can include a memory, also referred to as a non-transitory computer-readable medium a non-transitory processor-readable medium having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to: magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules, Read-Only Memory (ROM), Random-Access Memory (RAM) and/or the like. Nodes of distributed networks described herein also include one or more processors communicatively coupled to the memory and operable to execute the code stored on the non-transitory processor-readable medium. Examples of processors include general purpose processors (e.g., CPUs), Graphical Processing Units, Field Programmable Gate Arrays (FPGAs), Application Specific Integrated Circuits (ASICs), Digital Signal Processor (DSPs), Programmable Logic Devices (PLDs), and the like. Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using imperative programming languages (e.g., C, Fortran, etc.), functional programming languages (Haskell, Erlang, etc.), logical programming languages (e.g., Prolog), object-oriented programming languages (e.g., Java, C++, etc.) or other suitable programming languages and/or development tools. Additional examples of computer code include, but are not limited to, control signals, encrypted code, and compressed code.

Where methods described above indicate certain events occurring in certain order, the ordering of certain events may be modified. Additionally, certain of the events may be performed concurrently in a parallel process when possible, as well as performed sequentially as described above. Although various embodiments have been described as having particular features and/or combinations of components, other embodiments are possible having a combination of any features and/or components from any of the embodiments where appropriate.

What is claimed is:

1. A non-transitory processor-readable medium storing code representing instructions configured to be executed by a processor, the code comprising code to cause the processor to:

send an indication of an available processing capacity;

receive an indication of a processing task in response to sending the indication of the available processing capacity, the processing task associated with a smart contract recorded in a distributed ledger;

execute the processing task to completion to produce an output;

define, after completing the processing task, a cryptographic proof that the processing task was completed;

send the output of the processing task to a recipient node; and receive a payment token in response to the cryptographic proof satisfying the smart contract.

2. The non-transitory processor-readable medium of claim 1, wherein the cryptographic proof is a non-interactive zero-knowledge proof.

3. The non-transitory processor-readable medium of claim 1, wherein the available processing capability is available cycles on a graphical processing unit.

4. The non-transitory processor-readable medium of claim 1, wherein the processing task includes transferring a live video stream to a destination node.

5. The non-transitory processor-readable medium of claim 1, wherein the processing task includes transferring a live video stream to a destination node with a latency of less than one second.

6. The non-transitory processor-readable medium of claim 1, wherein the processing task includes transferring a live video stream to a destination node, the code further comprising code to cause the processor to:

store a persistent copy of the live video stream in an archive.

7. The non-transitory processor-readable medium of claim 1, wherein the processing task includes training a machine learning model.

8. The non-transitory processor-readable medium of claim 1, wherein:

the payment token is a first payment token; and the code to cause the processor to send the indication of the available processing capacity includes code to cause the processor to stake a second payment token as a condition of the smart contract to receive the processing task.

9. The non-transitory processor-readable medium of claim 1, wherein:
the payment token is a first payment token, and
the indication of the available processing capacity is sent to the smart contract and identifies a second token held in escrow pending completion of the completion of the processing task.

10. The non-transitory processor-readable medium of claim 1, wherein the smart contract identifies the payment token that is held in escrow pending completion of the processing task.

11. The non-transitory processor-readable medium of claim 1, wherein:
the processing task is from a plurality of subtasks;
the payment token is from a plurality of payment tokens; and
the smart contract is configured to release the plurality of payment tokens from escrow upon completion of the plurality of subtasks.

12. A non-transitory processor-readable medium storing code representing instructions configured to be executed by a processor, the code comprising code to cause the processor to:
access a smart contract containing a processing request;
access a distributed hash table stored on a distributed ledger, the distributed hash table identifying a plurality of miner nodes offering processing capability;
identify a recipient node to which an output of the processing request is to be sent based on the processing request;
select a miner node from the plurality of miner nodes based on at least one of a processing capability of that miner node or a geographic proximity between the recipient node and that miner node; and
send a signal to that miner node such that that miner node delivers the output of the processing request to the recipient node in response to that miner node completing the processing request.

13. The non-transitory processor readable medium of claim 12, the code further comprising code to cause the processor to:
receive a cryptographic proof that the output of the processing task was sent to the recipient node; and
send a signal to a compute device storing a copy of the smart contract in response to receiving the cryptographic proof such the smart contract causes the compute device to perform an action contingent on the processing request being completed.

14. The non-transitory processor readable medium of claim 12, the code further comprising code to cause the processor to:
receive a cryptographic proof that the output of the processing task was sent to the recipient node; and
send a signal to a compute device storing a copy of the smart contract in response to receiving the cryptographic proof such that a payment token that was placed in escrow pending completion of the processing request is transferred to a wallet associated with the miner node, in response to the signal.

15. The non-transitory processor-readable medium of claim 12, wherein the distributed hash table identifies a payment token placed in escrow by the miner node, and the miner node is selected based, at least in part, on a value of the payment token.

16. The non-transitory processor-readable medium of claim 12, wherein:
the recipient node is from a plurality of recipient nodes,
the processing task includes sending streaming video to the plurality of recipient nodes, the code further comprising code to cause the processor to:
select a subset of the miner nodes from the plurality of miner nodes to define a distributed streaming network such that each recipient node from the plurality of recipient nodes receives the streaming video from a miner node from the subset of the plurality of miner nodes.

17. The non-transitory processor-readable medium of claim 12, wherein the recipient node is a first recipient node, the miner node is a first miner node, the code further comprising code to cause the processor to:
select a second miner node from the plurality miner nodes to complete a subtask associated with the processing request;
receive a signal from the second miner node indicating a failure to complete the subtask; and
send a signal to the smart contract such that a payment token staked by the second miner node is forfeited by the second miner node in response to the failure to complete the subtask.

18. The non-transitory processor-readable medium of claim 12, wherein the miner node is selected form the plurality of miner nodes based at least in part a reputation of the miner node, the reputation of the miner node encoded into the distributed ledger using a Merkle tree, the miner node identified by a public key associated with the miner node.

19. A non-transitory processor-readable medium storing code representing instructions configured to be executed by a processor, the code comprising code to cause the processor to:
define a processing task for completion by a distributed network;
define a smart contract that identifies the processing task and includes a staked payment token for release upon successful completion of the processing task; and
submit the smart contract to a distributed ledger such that each miner node from a plurality of miner nodes completes a subtask from a plurality of subtasks associated with the processing task and generates a cryptographic proof-of-work associated with the completion of that subtask in response to an indication of that subtask received at that miner node,
the smart contract defined to automatically award each miner node from the plurality of miner nodes a portion of the staked payment token upon completion of a subtask from the plurality of subtasks.

20. The non-transitory processor-readable medium of claim 19, wherein the processing task is associated with the training of a machine learning algorithm, the code further comprising code to cause the processor to:
receive an output from the plurality of miner nodes associated with the trained machine learning algorithm.

21. The non-transitory processor-readable medium of claim 19, the code further comprising code to cause the processor to:
send, to a first miner node from the plurality of miner nodes, live video such that the first miner node sends the live video to a recipient node with a latency of less than 1 second.

22. The non-transitory processor-readable medium of claim 19, wherein the processing task is associated with streaming live video to a plurality of recipients, the code further comprising code to cause the processor to:

send, to a first miner node from the plurality of miner nodes, live video such that the first miner node sends the live video to a second miner node from the plurality of miner nodes that is configured to deliver the live video to at least two recipients from the plurality of recipients with a latency of less than 1 second.

23. The non-transitory processor-readable medium of claim 19, wherein a size of the staked payment token is associated with a priority that the processing task receives from the plurality of miner nodes.

24. The non-transitory processor-readable medium of claim 19, the code further comprising code to cause the processor to receive a portion of the staked payment token based on a miner node from the plurality of miner nodes failing to complete a subtask assigned to that miner node.

* * * * *